United States Patent [19]

Golinelli

[11] Patent Number: 4,616,420

[45] Date of Patent: Oct. 14, 1986

[54] CARTRIDGE HEAD FOR CHECKING LINEAR DIMENSIONS

[75] Inventor: Guido Golinelli, Bologna, Italy

[73] Assignee: Finike Italiana Marposs S.p.A., S. Marino di Bentivoglio, Italy

[21] Appl. No.: 736,526

[22] Filed: May 21, 1985

Related U.S. Application Data

[63] Continuation of Ser. No. 521,263, Aug. 8, 1983, abandoned.

[30] Foreign Application Priority Data

Sep. 9, 1982 [IT] Italy .................................. 3528 A/82

[51] Int. Cl.⁴ .............................................. G01B 7/02
[52] U.S. Cl. .................................... 33/172 E; 33/559; 33/561; 33/169 R
[58] Field of Search ............. 33/169 R, 172 R, 172 E, 33/DIG. 5, 166, 554, 556, 558, 559, 561; 336/30

[56] References Cited

U.S. PATENT DOCUMENTS

| | | | |
|---|---|---|---|
| 2,583,791 | 1/1952 | Neff | 33/DIG. 5 |
| 3,434,086 | 3/1969 | Houpt et al. | |
| 3,888,012 | 6/1975 | Droz | 33/174 L |
| 3,987,552 | 10/1976 | Raiteri | 33/172 E X |
| 4,347,492 | 8/1982 | Davis et al. | 33/172 E X |
| 4,386,467 | 6/1983 | Possati et al. | |

FOREIGN PATENT DOCUMENTS

| | | |
|---|---|---|
| 0026858 | 9/1980 | European Pat. Off. |
| 906206 | 7/1970 | Italy |
| 0029758 | 3/1977 | Japan .................. 33/169 R |
| 594874 | 1/1978 | Switzerland |
| 623178 | 5/1949 | United Kingdom |
| 762361 | 11/1956 | United Kingdom |
| 1313804 | 4/1973 | United Kingdom |
| 1469377 | 4/1977 | United Kingdom |
| 1583504 | 1/1981 | United Kingdom |

*Primary Examiner*—Harry N. Haroian
*Attorney, Agent, or Firm*—Stevens, Davis, Miller & Mosher

[57] ABSTRACT

A cartridge gauging head for checking linear dimensions of parts comprises a tubular casing, a shaft axially movable with respect to the casing, a feeler fixed at an end of the shaft for contacting the part to be checked, a transducer for providing a signal depending on the mutual positions of the shaft and the casing, and a guide member for guiding the axial displacements of the shaft. The guide member includes an intermediate portion coupled to the casing and two end portions adapted to cooperate with the shaft for guiding it.

20 Claims, 4 Drawing Figures

CARTRIDGE HEAD FOR CHECKING LINEAR DIMENSIONS

This application is a continuation, of application Ser. No. 521,263, filed Aug. 8, 1983, now abandoned.

BACKGROUND OF THE INVENTION

1. Field of the Invention

The present invention relates to a cartridge type gauging head for checking linear dimensions of parts, including a substantially tubular casing, a shaft partially housed in said casing and axially movable with respect to it, a feeler coupled to the shaft for contacting the part to be checked, a guide device for guiding the axial displacement of the shaft with respect to the casing, a position transducer for providing a signal depending on the mutual positions of the shaft and the casing and resilient means for urging the shaft along a measurement direction.

2. Description of the Prior Art

Cartridge heads of the type referred to hereinabove are described in Swiss Pat. No. 594874 and U.S. Pat. No. 3,434,086. In particular, U.S. Pat. No. 3,434,086 discloses a cartridge type head comprising a generally cylindrical metal shell adapted to be closed with a metal cap which may be cemented into place or otherwise affixed. The cap has a neck provided with an axial bore guiding an armature assembly. A bobbin assembly may be cemented in the metal shell or held in place by the cap and a bushing.

It is also known in the art, as disclosed in Italian Pat. No. 906.206, to guide the axial displacements of a shaft or spindle with respect to a casing by means of a bushing including a first portion fixed to the casing, a second portion matched with a small radial clearance to the spindle for axially guiding it and an intermediate portion adapted for preventing the transmission of deformations from the first to the second portion of the bushing.

SUMMARY OF THE INVENTION

It is an object of the invention to provide a cartridge type head that is more robust and reliable and guarantees better accuracy than the known cartridge heads.

This and other objects and advantages are attained by a cartridge head of the type specified at the beginning of the present description wherein, according to the invention, the guide device includes an intermediate portion fixed to the casing, guide elements adapted to guide the axial displacements of the shaft and two connection portions between the intermediate portion and the guide elements, the connection portions being adapted to prevent the transmission of deformations from the intermediate portion to the guide elements.

BRIEF DESCRIPTION OF THE DRAWINGS

The invention is now described in detail with reference to the accompanying drawings, given by way of non-limiting example, in which.

DETAILED DESCRIPTION

Figure 1:
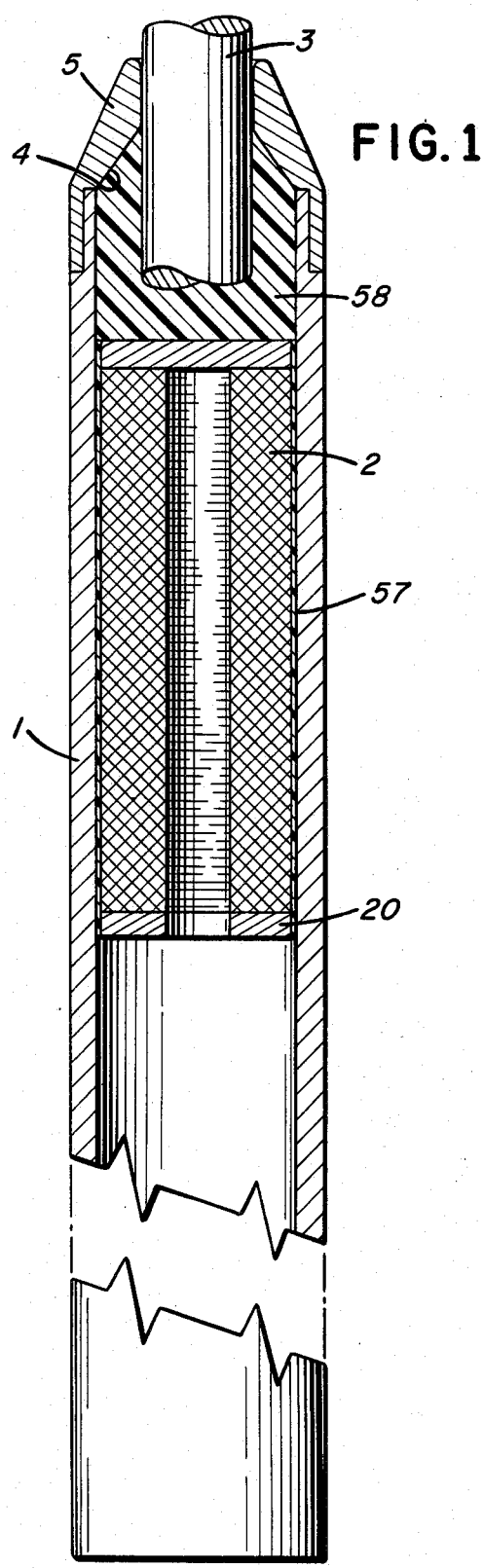
FIG. 1 is a partially cross-sectioned longitudinal view showing two semi-finished parts of a cartridge gauging head, after their assemblage.

With reference to FIG. 1, a tubular cylindrical casing 1 defines a first semi-finished part having a longitudinal geometrical axis; a first portion 2 of a position transducer of the differential transformer type, basically comprises electrical windings and forms, together with an electric cable—for power supply and transmission—, a second semi-finished part.

The latter semi-finished part is connected to the first, as shown in FIG. 1, by coupling, by means of a fixed connection, portion 2 of the transducer to the inside wall of casing 1.

Figure 4:
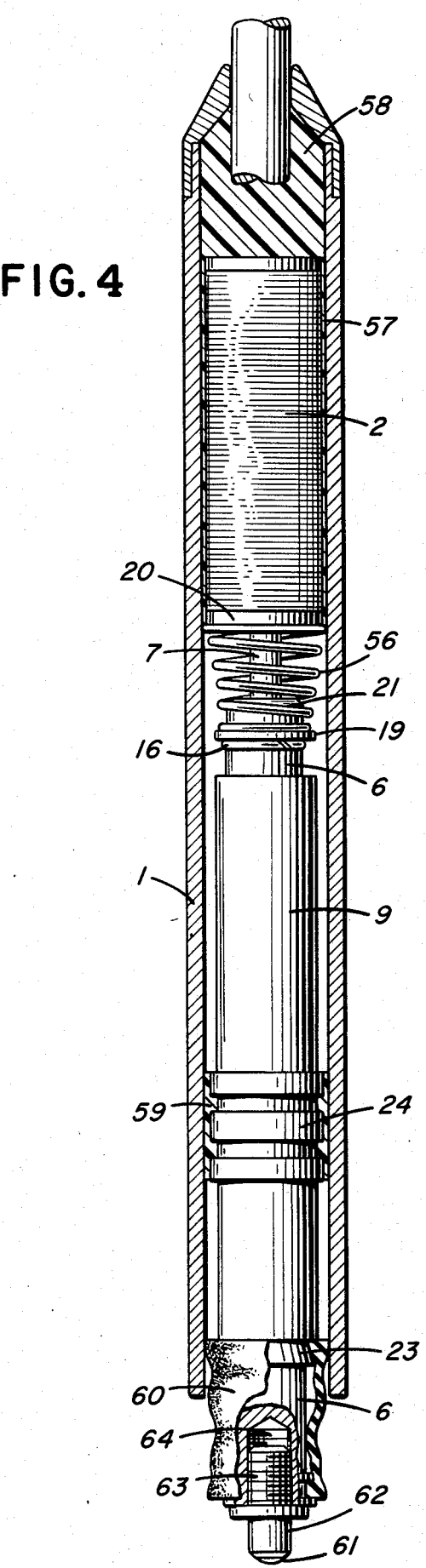
FIG. 4 is a longitudinal partially cross-sectioned view, with a smaller scale with respect to that of FIGS. 1 to 3, of a gauging head achieved by assembling the semi-finished part shown in FIG. 2 or in FIG. 3 with those of FIG. 1.

The coupling is achieved by using a resin or glue 57, preferably "Araldite" (refer to FIG. 4 too).

In this way, a portion of the inside surface of casing 1, together with a surface of said portion 2 of the transducer, define an upper end chamber 4 housing the wires (not shown in the drawing) contained in cable 3 and an end of the cable.

Chamber 4 is then filled with a resin 58, in this case too preferably "Araldite", that ensures the upper sealing of the gauging head and moreover serves to reliably fix the end of cable 3 so as to preserve it against accidental tears.

Chamber 4 is then closed on top by a protective cap 5 that serves to prevent excessive bendings of cable 3.

Figure 2:
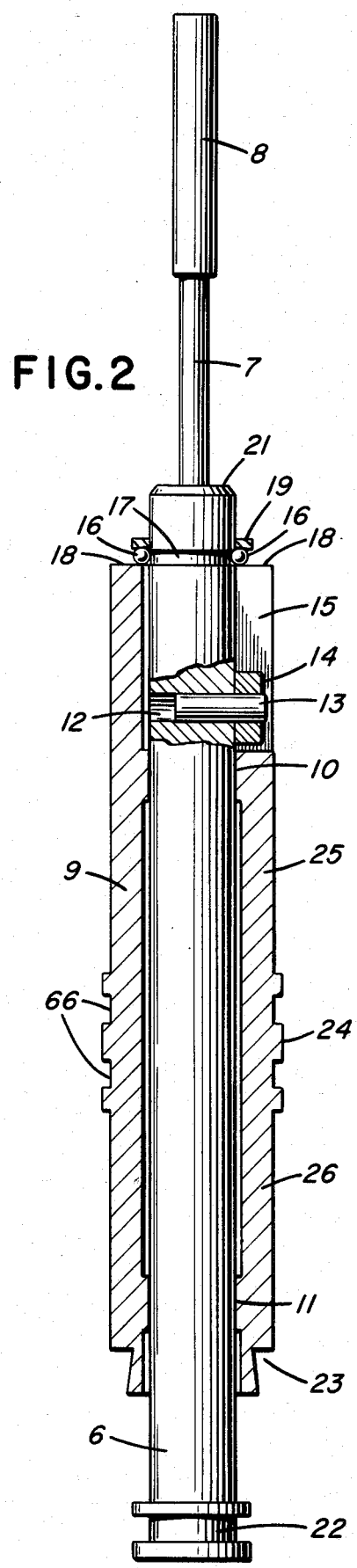
FIG. 2 is a longitudinal partially cross-sectioned view of a third semi-finished part of the gauging head.

In FIG. 2 there is shown a third semi-finished part, basically including an integral member defining a hollow guide device 9 and a shaft or stem 6 passing through the guide device 9 and adapted to cooperate with two guide elements including internal cylindrical surface portions 10 and 11 of the guide device 9.

In fact, between surface portions 10 and 11 and shaft 6 there is a small radial play, ensuring guiding of the axial sliding of shaft 6.

At an end of shaft 6 there is coupled, through a stem 7, a magnetic core 8, that forms the second part of the transducer.

In a through hole 12, transversally formed in shaft 6, there is partially inserted a pin 13, carrying at a free end a small idle wheel 14; a slot 15, longitudinally formed in guide device 9 and being slightly larger than the diameter of idle wheel 14, houses wheel 14, that slides therein while shaft 6 moves with respect to said guide device, so preventing a rotation motion of shaft 6 about its axis i.e. rotation of shaft 6 with respect to guide device 9.

A split toroidal ring 16 is arranged in an appropriate seat 17 of shaft 6, and can abut against an end base surface 18 of guide device 9 for limiting the stroke of shaft 6 in the measurement direction.

This third semi-finished part, shown in FIG. 2, is coupled to the first semi-finished part—consisting in tubular casing 1 (already coupled to portion 2 of the transducer)—by connecting, by means of a fixed connection, guide device 9 to said casing. This connection is achieved by gluing a cylindrical portion 24 of the outside surface of guide device 9 to a limited section of the inside surface of tubular casing 1, as shown in FIG. 4. Preferably, the type of glue or resin 59 used is "Araldite". In order to make the coupling more stable, portion 24 has annular grooves 66 that fill up with part of the glue. Cylindrical portion 24—that, owing to grooves 66 is in actual fact formed by three cylindrical portions—is intermediate with respect to portions 10, 11, to which it is connected by means of other cylindrical portions 25 and 26 of a smaller thickness.

It should be realized that the connection position of guide device 9 with respect to casing 1 defines the amount of prestroke of the gauging head, i.e. the length that the shaft has to pre-travel so that the head, from the rest condition, reaches the measuring condition.

The particular shape of the guide device presents other advantages: any pressures applied on and consequent deformations of the outside surface of tubular casing 1 can be transmitted to guide device 9 in correspondence with portion 24; but they are not transmitted to portions 10 and 11 that directly cooperate with shaft 6, as they are absorbed by connection portions 25 and 26 which are resiliently deformable.

A pressure spring 56, shown in FIG. 4, tends to push shaft 6 in the measurement direction because it has an end abutting against a ring 19 fixed to shaft 6 and another end abutting against a ring 20 fixed to a base of the first transducer.

The stroke limit of shaft 6 in the opposite direction with respect to the measurement one is reached when the base surface 21 of shaft 9 abuts against ring 20.

An annular seat 22, formed at an end of shaft 6, is adapted for housing an end of a bellows-shaped gasket 60, shown—partially cross-sectioned—in FIG. 4, that ensures the sealing of the gauging head.

A seat 23 for the other end of gasket 60 is partially formed in the guide device 9 and partially limited by a section of the inside surface of tubular casing 1.

Seats 22 and 23 are shaped in such a way that the ends of bellows gasket 60 are subject to compression stresses, and in this way—as described in U.S. Pat. No. 4,386,467—there is ensured safe coupling.

A feeler 61, preferably made of carbide, is fixed to a base of a cylinder-like shaped element 62, that has at its other end a threaded portion 63; portion 63 is fixed to shaft 6 i.e. screwed in a threaded hole 64 formed at the end of shaft 6 that is outside casing 1. Feeler 61, owing to the action of spring 56, is urged, with an appropriate amount of contact force, against the mechanical pieces or parts to be checked so as to detect their deviations with respect to prefixed or nominal linear dimensions.

Figure 3:
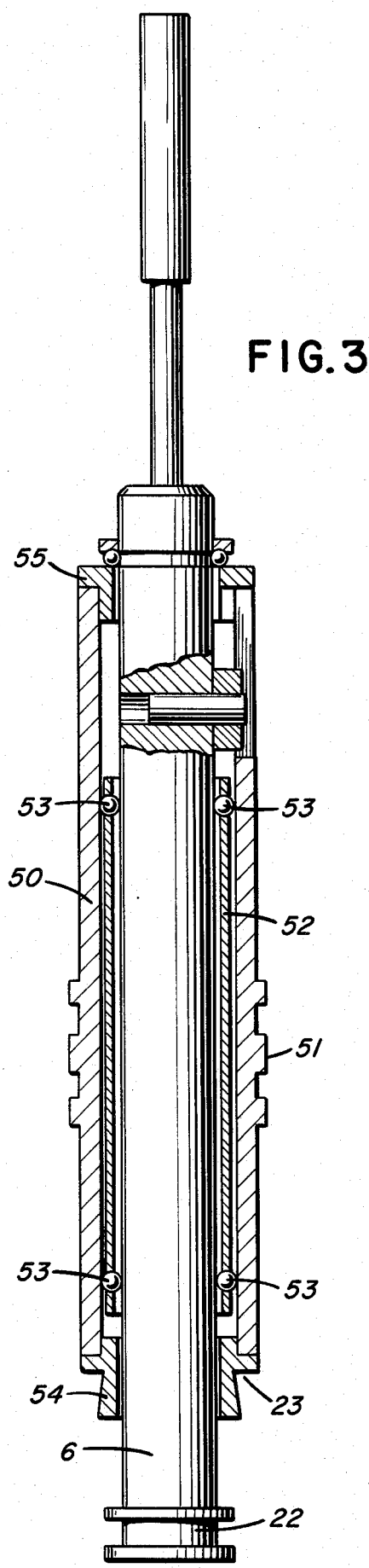
FIG. 3 shows a longitudinal partially cross-sectioned view of a variant of the semi-finished part shown in FIG. 2.

In FIG. 3 there is shown a semifinished part identical to that of FIG. 2, but featuring a different embodiment of the guide device that enables shaft 6 to slide with respect to tubular casing 1.

This device consists of an integral member or element 50, with a substantially cylindrical shape, adapted for being fixed, by means of glue or resin, to the tubular casing 1 at an intermediate section 51, in all aspects similar to portion 24 shown in FIG. 2. A bushing 52 is placed between element 50 and shaft 6; bushing 52 houses, in appropriate seats formed near its ends, guide elements i.e. balls 53, that can contact element 50 on the one side and shaft 6 on the other, so enabling their relative motion.

In every operating condition of the gauging head, balls 53 are arranged at a considerable axial distance from intermediate section 51. Moreover the sections of element 50 adjacent intermediate section 51 have a reduced thickness with respect to that of section 51. Accordingly the sections of element 50 adjacent intermediate section 51 are resiliently deformable for preventing transmissions of substantial stresses and deformations from casing 1 and intermediate section 51 to balls 53, thus allowing axial sliding of shaft 6 without danger of seizure.

Two caps 54 and 55, coupled to the ends of element 50, limit the axial displacements and prevent outgoing of bushing 52. Furthermore element 54 defines the partial seat 23 for sealing gasket 60.

As shown in FIG. 4, tubular casing 1 houses at its interior the end of gasket 60 located in seat 23 and a longitudinal portion of the gasket; thus gasket 60 is protected, partially or totally, by casing 1.

It is obvious that while the above embodiments have been given by way of illustrative examples, many modifications of constructional detail and design can be made thereto by persons skilled in the art without departing from the scope of the invention. For example, the fixed connections between the casing and the first portion of the transducer and between the guide device and the casing instead of being obtained by means of glue, can be obtained by other means, for example welding or interference-fit.

What is claimed is:

1. A cartridge type gauging head for checking linear dimensions, comprising a substantially tubular casing defining a longitudinal axis, a shaft partially housed in said casing and movable with respect to it along said axis, a feeler coupled to the shaft for contacting the part to be checked, a position transducer for providing a signal depending on the mutual positions of the shaft and the casing, including a first part fixed to the internal surface of the tubular casing and a second part carried by the shaft, resilient means for urging the shaft along a measurement direction, and a guide device including a substantially cylindrical intermediate portion, guide portions lying on either side of the intermediate portion and adapted to guide the axial displacements of the shaft and two substantially cylindrical connection portions connected between the intermediate portion and the guide portions, the intermediate portion having an enlarged thickness with respect to that of both connection portions and being fixed to the internal surface of the tubular casing, both said connection portions defining external surfaces faced to and separate from the internal surface of the casing and being resiliently deformable for preventing the transmission of deformations from the intermediate portion to the guide portions.

2. The gauging head according to claim 1, wherein said guide device basically consists of a single integral member.

3. The gauging head according to claim 2, wherein said integral member has two sections with internal cylindrical surfaces, the guide portions being defined by said sections and being integrally connected to said intermediate portion through the connection portions.

4. The gauging head according to claim 3, wherein said intermediate portion is fixed to the casing by a fixed connection.

5. The gauging head according to claim 4, wherein said fixed connection is obtained by gluing the intermediate portion to the internal surface of the casing.

6. The gauging head according to claim 1, wherein said guide device includes a first member defining said intermediate portion and said connection portions and a ball bushing arranged between the first member and the shaft, the ball bushing including said guide portions.

7. The gauging head according to claim 6, wherein said ball bushing has two ends with seats for housing said guide portions, the guide portions including a plurality of balls.

8. The gauging head according to claim 6, wherein said intermediate portion is fixed to the internal surface of the casing by gluing.

9. The gauging head according to claim 1, further including a sealing bellows, the shaft and the guide device defining annular seats for housing relevant ends of the bellows through couplings generating substantially compression stresses on the bellows ends.

10. The gauging head according to claim 9, wherein a portion of said sealing bellows is housed within said tubular casing.

11. The gauging head according to claim 1, further including an electric cable connected to the transducer, wherein the tubular casing defines an end chamber for housing the cable, the chamber being sealed by a resin.

12. The gauging head according to claim 1, wherein the transducer includes a first transducer element coupled to the internal surface of the casing by a fixed connection and a second transducer element coupled to the shaft, the shaft defining abutment surfaces adapted to cooperate with the guide device and the first transducer element for limiting the stroke of the shaft.

13. The gauging head according to claim 1, further including an idle wheel coupled to the shaft and wherein the guide device defines a slot for housing said wheel while preventing rotation of the shaft.

14. A cartridge type gauging head for checking dimensions of mechanical pieces, comprising:
a first semifinished part including a substantially tubular outer casing defining a longitudinal axis;
a second semifinished part including a first element of a position transducer, this element being fixed to the internal surface of the tubular casing; and
a third semifinished part including: a shaft carrying at an end a feeler adapted to contact the piece to be checked and at another end a second element of the position transducer; and an elongated integral member defining an intermediate portion adapted to be fixed to the internal surface of the casing, two guide portions lying on either side of the intermediate portion and adapted to cooperate with the shaft for guiding axial displacements of the shaft along said longitudinal axis and two connection portions connected between the intermediate portion and the guide portions, the connection portions having a smaller thickness than that of the intermediate portion and being resiliently deformable for preventing the transmission of deformations from the intermediate portion to the guide portions.

15. The gauging head according to claim 14, wherein the first element of the position transducer and the intermediate portion are fixed to the internal surface of the casing through a resin.

16. The gauging head according to claim 15, further comprising a spring arranged between the shaft and the first element of the position transducer for urging the shaft along a measurement direction and sealing means for sealing the ends of the tubular casing, the sealing means including a bellows coupled to the tubular casing and the end of the shaft carrying the feeler and a resin filling the end of the tubular casing adjacent the first transducer element.

17. The gauging head according to claim 16, wherein the third semifinished part includes an antirotation element coupled to the shaft and a slot defined in said integral member for slidably housing the antirotation element, for preventing rotation of the shaft with respect to the integral member.

18. A cartridge type gauging head for measuring deviations of dimensions of mechanical pieces with respect to a nominal dimension, comprising:
a first semifinished part including a substantially cylindrical hollow casing defining a longitudinal axis;
a second semifinished part including a first element of a position transducer, this element being fixed to the internal surface of the cylindrical casing; and
a third semifinished part including: a shaft carrying at an end a feeler adapted to contact the piece to be checked and at another end a second element of the position transducer; a ball bushing having at relevant ends seats housing balls adapted to cooperate with the shaft; and a hollow member internally housing the ball bushing and the shaft, the hollow member having an intermediate portion lying between said seats housing balls and adapted to be fixed to the internal surface of the casing, and two portions adjacent the intermediate portion and having ends adapted to cooperate with said balls, said two portions of the hollow member having a reduced thickness with respect to that of the intermediate portion and being resiliently deformable for preventing the transmission of substantial stresses from the casing and the intermediate portion of the hollow member to the ball bushing.

19. The gauging head according to claim 18, wherein the first element of the position transducer and the intermediate portion of the hollow member are fixed to the internal surface of the cylindrical casing through a resin.

20. The gauging head according to claim 19, further including two caps coupled to relevant ends of the hollow member for limiting axial displacement of the ball bushing.

* * * * *